Feb. 5, 1935.    O. K. BECKLER    1,989,964
WINDOW LIFT FOR VEHICLES
Filed Sept. 25, 1933    2 Sheets-Sheet 1
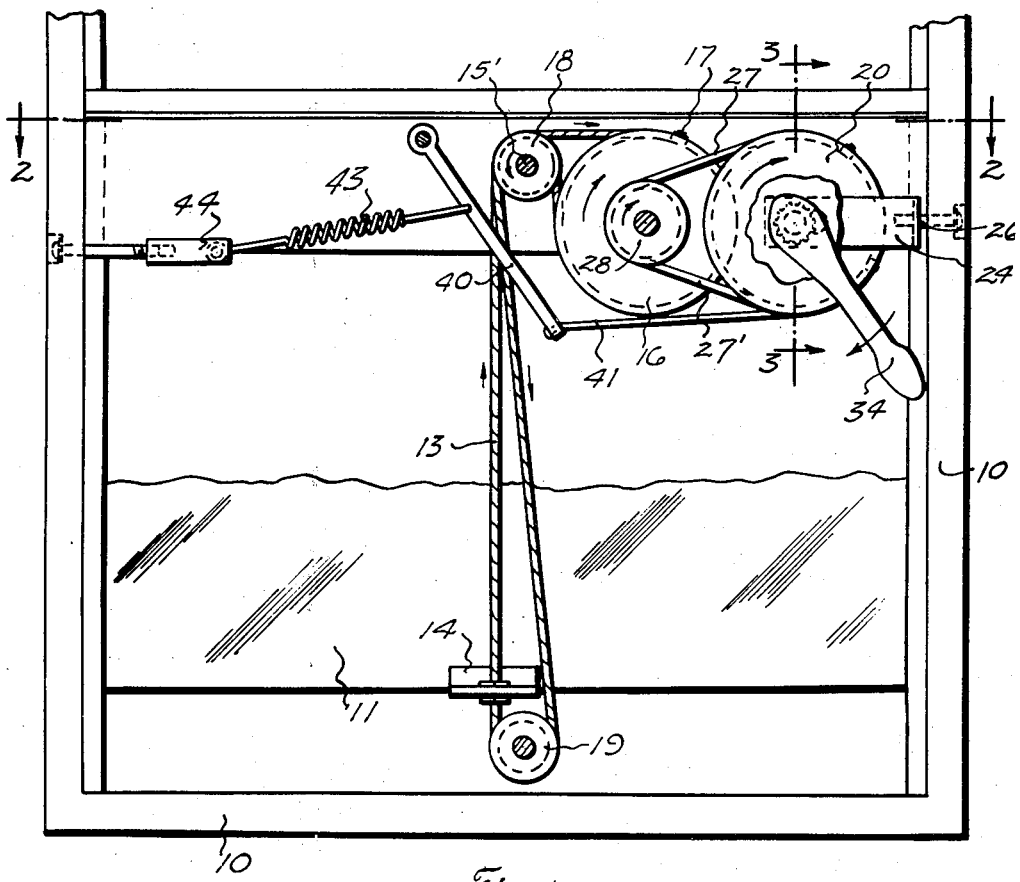
Fig. 1
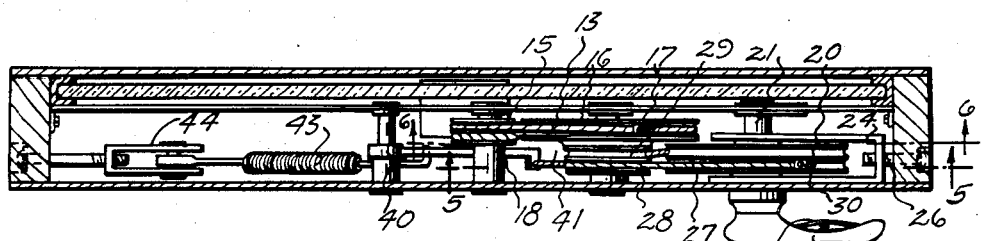
Fig. 2
Fig. 3
Inventor
Oakley K. Beckler
By Jack A. Athley
Attorney Feb. 5, 1935.  O. K. BECKLER  1,989,964
WINDOW LIFT FOR VEHICLES
Filed Sept. 25, 1933  2 Sheets-Sheet 2
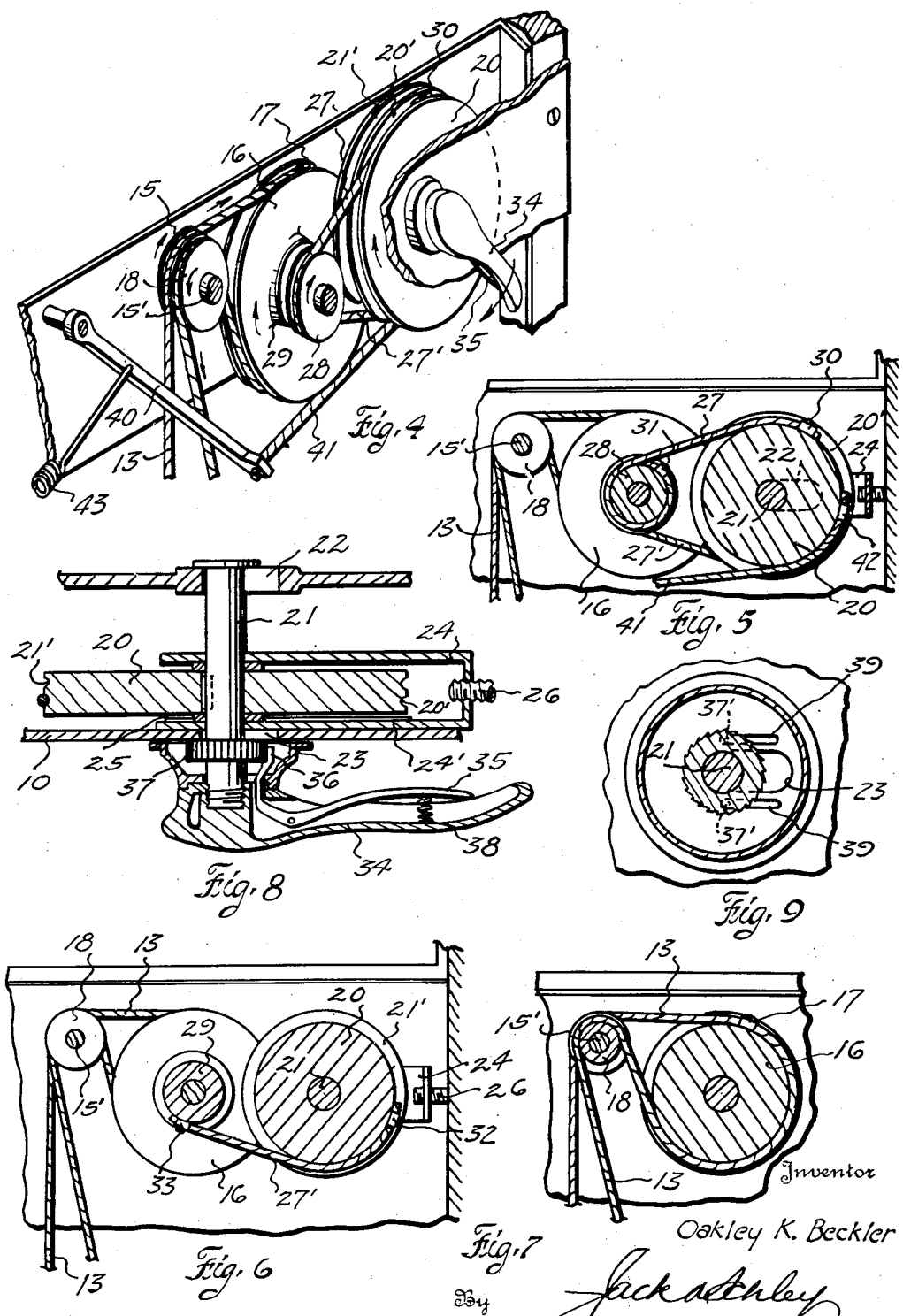
Inventor
Oakley K. Beckler
By Jack A. Ashley
Attorney Patented Feb. 5, 1935

1,989,964

UNITED STATES PATENT OFFICE 1,989,964

WINDOW LIFT FOR VEHICLES

Oakley K. Beckler, Dallas, Tex., assignor of forty-nine per cent to Grove W. Harris, Marshalltown, Iowa, and J. V. Bass, Omaha, Nebr.

Application September 25, 1933, Serial No. 690,867

11 Claims. (Cl. 268—128)

This invention relates to new and useful improvements in window lifts for vehicles.

One object of the invention is to provide improved means for quickly and easily raising or lowering a window, and being especially adapted for use with the window of an automobile.

Another object of the invention is to provide improved means for raising and lowering a vehicle window, which includes an operating member, the member being so arranged that when moved in a short arc it will raise or lower the window its entire distance.

A further object of the invention is to provide an improved window lift for vehicle windows, which includes an operating member arranged to be moved to raise or lower the window and means for locking the operating member to hold the window in adjusted intermediate positions.

Still another object of the invention is to provide an improved window lift for vehicle windows, which includes a differential pulley arrangement which is operated by an operating member, the differential pulley arrangement having connection with the window glass, whereby a minimum swing of the operating member will impart a maximum movement to the window glass.

A further object of the invention is to provide an improved window lift for a window which includes a counterbalance for said window, whereby the operation is made easier and the window will be held in intermediate positions by said counterbalance.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an elevation of a window lift applied to an automobile window and constructed in accordance with the invention, Figure 2 is a horiozntal cross-sectional view, taken on the line 2—2 of Figure 1, Figure 3 is a transverse vertical sectional view taken on the line 3—3 of Figure 1, Figure 4 is an isometrical view of the operating pulleys and cables, Figure 5 is a longitudinal vertical sectional view of the pulleys taken on the line 5—5 of Figure 2, Figure 6 is a longitudinal vertical sectional view of the pulleys taken on the line 6—6 of Figure 2, Figure 7 is a longitudinal vertical sectional view of the drive and idler pulleys, Figure 8 is a detail sectional view of the operating lever, and Figure 9 is a detail of the operating pulley shaft and the ratchet wheel mounting.

In the drawings, the numeral 10 designates the usual car door of an automobile having a vertically sliding window glass 11 therein. The construction of the door is unimportant as the invention may be applied to any vertically sliding window glass.

In carrying out the invention, an endless cable 13 is secured to the lower central portion of the window glass by a clamp 14. As shown in Figure 1, the cable passes upwardly over an idler pulley 15 and then around a large counter pulley 16 to which it is fastened by a suitable clamp 17. With the window in its lowered position (Figure 1), the clamp 17 is near the top center of the pulley 16. After passing around the pulley 16, the cable extends over a second idler pulley 18, which is loosely mounted on a shaft 15' in front of the pulley 15, which is also journaled on said shaft. The cable then continues downwardly and around a third idler pulley 19 at the lower central portion of the door, after which said cable returns to the clamp 14 on the window glass. It is obvious that when the counter pulley 16 is rotated in a clockwise direction, the cable 13 will be carried therearound, due to said cable being fastened to said pulley by the clamp 17. As the cable travels around the counter pulley, the window glass 11 will be raised. By rotating the counter pulley in a counter-clockwise direction, the pull on the cable will be in an opposite direction which will lower the window glass. The pulley 16 is of such size that approximately three-quarters rotation thereof will raise or lower the window glass its entire distance. In other words, during the raising of the glass, the clamp 17 on the counter pulley will travel from the position shown in Figure 1 through an arc of approximately 270 degrees. When the window is again lowered, the clamp will be returned to the position shown in Figure 1.

For rotating the counter pulley to raise and lower the window glass, a double-grooved operating pulley 20 is mounted adjacent the pulley 16 within the door 10 on a suitable shaft 21. The outer ends of the shaft are mounted to slide horizontally, as will be hereinafter explained, in slots 22 and 23 which are provided in the side walls of the door 10. For reducing the rotation of the double-grooved operating pulley 20 to a minimum while obtaining approximately a three-quarter rotation of the counter pulley 16, the operating pulley has connection through a pair of cables 27 and 27' with a pair of small pulleys 28 and 29, which are made integral with and are positioned on the inner side of the counter pulley 16. The particular way in which the cables 27 and 27' connect the pulleys 28 and 29 with the operating pulley 20 is important and the arrangement is clearly shown in Figures 5 and 6.

One end of the cable 27 passes over the top of the operating pulley 20 and is fastened in the outer groove 20' by a suitable clamp 30. The other end of the cable passes over and around the outer small pulley 28 (Figure 5) and is secured thereto by a clamp 31. The cable 27' passes beneath the operating pulley 20 and a clamp 32 fastens said cable to the inner groove 21' of the pulley. The other end of the cable 27' extends beneath the inner small pulley 29 (Figure 6), being clamped thereto by a clamp 33.

It is pointed out that with the parts in the position shown in the drawings, the window is in a lowered position and the cable 27, which is secured to the outer pulley 28, completely surrounds this pulley. The greater portion of the cable 27', however, is at this time wound around the inner groove of the operating pulley 20, and the clamp 33 which secures it to the small inner pulley 29 is near the lower central portion of said pulley.

When the operating pulley is rotated in a clockwise direction (Figure 1), the small pulleys 28 and 29 are rotated in a similar direction. The pull on the cable 27 is from the point where this cable is fastened to the outer groove 20' of the operating pulley, or from the point where the clamp 30 is bolted to said pulley. The rotation of the pulley 20 will unwind the cable 27 from the small pulley 28 and at the same time the cable 27' will be wound around its small pulley 29. Similarly, when the window glass is being lowered and the operating pulley is rotated in a counter-clockwise direction, the pull on the cable 27' is from the point where the clamp 32 secures said cable to the inner groove 21' of the operating pulley. Thus, by using the two small pulleys 28 and 29 with the arrangement of the cables 27 and 27', a positive operating action is had, both when raising and lowering the window. In other words, the window glass will not depend on gravity for its lowering action.

Following through the raising of the window from the position shown in Figure 1, it will be seen that clockwise rotation of the operating pulley imparts a similar action to the pulleys 28 and 29. Since these latter pulleys are made integral with the counter pulley 16, said counter pulley will also be rotated in a clockwise direction. This rotation of the counter pulley will, as has been explained, raise the window glass 11 through the medium of the cable 13.

The ratio between the double-grooved operating pulley 20 and the small pulleys 28 and 29 may vary, but it has been found desirable to construct them so that a rotation of the pulley 20 through an arc of approximately 120 degrees will rotate the pulleys 28 and 29 and the counter pulley 16 made integral therewith, approximately 270 degrees or three-quarters of a complete revolution, whereby the window glass 11 will be raised or lowered its entire distance. The above figures are merely explanatory and it is to be understood that the pulleys may be of any desired size.

It is pointed out that the shaft 21 of the operating pulley 20 is mounted in slots so that it may be adjusted horizontally, whereby any slack in the cables 27 and 27' may be readily taken up, thereby eliminating any lost motion. For holding the shaft 21 in an adjusted position, a take-up yoke 24 has its arms secured to the shaft. The inner arm 24' of the yoke is supported in a guide 25 which is positioned on the inner wall of the door 10, whereby the yoke is slidable therein. An adjusting screw 26 mounted in one end of the door is threaded through the end of the yoke and it is obvious that rotation of this adjusting screw will move said yoke horizontally, whereby the shaft 21 and operating pulley 20 will be adjusted.

For manually rotating the operating pulley 20, a suitable hand lever 34 is secured on the inner end of the shaft 21 within the vehicle, so as to be easily in reach of the occupant. The lever has a latch 35 pivoted on its rear side. A dog 36 on the end of the latch is normally held in engagement with a ratchet wheel 37 by a spring 38. The ratchet wheel is loosely mounted on the shaft 21 and is held against rotation with said shaft by pins 37' (Figures 3 and 9), which engage slots 39 in the inner wall of the door 10. The slots 39 are parallel with the slots 22 and 23 through which the shaft 21 extends. Thus, the ratchet wheel can be moved with the shaft 21 but it can not be rotated therewith.

It is obvious that when the dog 36 is in engagement with the ratchet wheel, swinging of the lever and rotation of the operating pulley 20 is prevented; however, when it is desired to swing the lever it is only necessary to depress the latch 35 to disengage the dog 36 from the ratchet. The engagement of the dog 36 with the ratchet wheel 37 will also serve to lock the window in intermediate positions.

For counterbalancing the weight of the window glass 11 and assuring smooth and easy operation when the same is being lowered and raised, an arm 40 is pivoted within the door 10. The lower end of the arm has a cable 41 fastened thereto and the other end of this cable is secured to the outer groove 20' of the operating pulley 20 by a clamp 42. A spring 43 has one end secured to the arm 40 and its other end pivoted in a take-up yoke 44. By adjusting the yoke the tension on the spring 43 is varied.

By observing Figure 1, it is obvious that when the window is in a lowered position the spring 43 is under tension. As the window is raised, the pulley 20 is rotated and the pull on the cable 41 is released thereby releasing tension on the spring 43. During the lowering operation the pulley 20 travels in a counter-clockwise direction and the cable 41 pulls the arm to the right (Figure 1) and places the spring under tension. The tension on the spring can be adjusted to balance the weight of the window glass 11 and it is obvious that the entire weight of the window is carried by the spring. Thus, the window will stay in any position and the latch 35 on the operating lever is merely a locking means to prevent the window from being jarred from its adjusted position.

The description which has been given recites more or less detail of a particular embodiment of the invention, which is set forth as new and useful; however, I desire it understood that the invention is not limited to such exact details of construction, because it is manifest that changes and modifications may be made within the scope of the appended claims, without departing from the spirit of the invention.

What I claim and desire to secure by Letters Patent is:

1. In combination with the sliding window glass of an automobile body, a counter pulley having connection with the bottom of said window glass for raising and lowering the same, an operating pulley for rotating the counter pulley, and means between the counter pulley and operating pulley for increasing the rotation of the former with relation to the latter, whereby a minimum rotation of the operating pulley is required to raise or lower the window glass its entire distance.

2. In combination with the sliding window glass of an automobile body, a counter pulley having connection with the bottom of said window glass for raising and lowering the same, an operating pulley for rotating the counter pulley, means between the counter pulley and operating pulley for increasing the rotation of the former with relation to the latter, whereby a minimum rotation of the operating pulley is required to raise or lower the window glass its entire distance, and means for locking the operating pulley against rotation to hold the glass in adjusted intermediate positions.

3. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, and differential pulleys connected with the enlarged pulley for rotating the same.

4. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, differential pulleys connected with the enlarged pulley for rotating the same, and means for locking the differential pulleys against operation to hold the window glass in adjusted position.

5. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, differential pulleys connected with the enlarged pulley for rotating the same, and means connected with the differential pulleys for counterbalancing the weight of the window glass, whereby said glass may be positioned at a desired intermediate position.

6. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, an operating pulley for rotating the enlarged pulley, means between the operating pulley and the enlarged pulley and connecting said pulleys for increasing the rotation of the latter with relation to the former, and means for locking the operating pulley against rotation to hold the window glass in adjusted positions.

7. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, an operating pulley for rotating the enlarged pulley, means between the operating pulley and enlarged pulley and connecting said pulleys for increasing the rotation of the latter with relation to the former, means connected with the operating pulley for counterbalancing the weight of the window glass, and means for locking the operating pulley against rotation to hold the window glass in adjusted positions.

8. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, an operating pulley for rotating the enlarged pulley, means between the operating pulley and enlarged pulley and connecting said pulleys for increasing the rotation of the latter with relation to the former, manually operated means for rotating the operating pulley, and means for locking said operating means to hold the window glass in adjusted positions.

9. In combination with the sliding window glass of an automobile body, a flexible lifting connection attached to the bottom of said window glass, pulleys for supporting said connection, an enlarged pulley to which the flexible connection is fastened for operating said flexible connection to raise and lower the window glass, an operating pulley for rotating the enlarged pulley, means between the operating pulley and enlarged pulley and connecting said pulleys for increasing the rotation of the latter with relation to the former, manually operated means for rotating the operating pulley, means connected with the operating pulley for counterbalancing the weight of the window glass, and means for locking the operating means to hold said window glass in adjusted positions.

10. In combination with the sliding window glass of an automobile body, a counter pulley having connection with the bottom of said window glass for raising and lowering the same, an operating pulley for rotating the counter pulley, means between the counter pulley and operating pulley for increasing the rotation of the former with relation to the latter, manually operated means for rotating the operating pulley, and means for locking said operating means to hold the window glass in adjusted positions.

11. In combination with the sliding window glass of an automobile body, a counter pulley having connection with the bottom of said window glass for raising and lowering the same, an operating pulley for rotating the counter pulley, means between the counter pulley and operating pulley for increasing the rotation of the former with relation to the latter, manually operated means for rotating the operating pulley, means connected with the operating pulley for counterbalancing the weight of the window glass, and means for locking the operating means to hold said window glass in adjusted positions.

OAKLEY K. BECKLER.